United States Patent [19]

Mueller

[11] Patent Number: 4,939,076
[45] Date of Patent: Jul. 3, 1990

[54] BARRIER STRETCH FILM

[75] Inventor: Walter B. Mueller, Inman, S.C.

[73] Assignee: W. R. Grace & Co.-Conn., Duncan, S.C.

[21] Appl. No.: 224,842

[22] Filed: Jul. 26, 1988

Related U.S. Application Data

[63] Continuation-in-part of Ser. No. 168,290, Mar. 15, 1988, abandoned.

[51] Int. Cl.⁵ .............................................. B32B 27/08
[52] U.S. Cl. .............................. 428/476.9; 428/36.7; 428/476.3; 428/516; 428/520
[58] Field of Search ............... 428/476.3, 474.4, 476.9, 428/520, 516, 36.6, 36.7

[56] References Cited

U.S. PATENT DOCUMENTS

| | | | |
|---|---|---|---|
| 4,064,296 | 12/1977 | Bornstein et al. | 428/516 |
| 4,226,822 | 10/1980 | Yoshikawa | 264/173 |
| 4,352,844 | 10/1982 | Bornstein | 428/35 |
| 4,376,799 | 3/1983 | Tusim | 428/213 |
| 4,390,587 | 6/1983 | Yoshimura | 428/215 |
| 4,399,180 | 8/1983 | Briggs | 428/212 |
| 4,442,147 | 4/1984 | Schirmer | 428/516 |
| 4,457,960 | 7/1984 | Newsome | 428/35 |
| 4,486,507 | 12/1984 | Schumacher | 428/476.3 |
| 4,542,075 | 9/1985 | Schirmer | 428/516 |
| 4,557,780 | 12/1985 | Newsome et al. | 428/475.8 |
| 4,568,580 | 2/1986 | Ghirardello et al. | 428/476.3 |
| 4,578,294 | 3/1986 | Ouchi et al. | 428/476.3 |
| 4,617,241 | 10/1986 | Mueller | 428/520 |
| 4,696,865 | 9/1987 | Richardson et al. | 428/474.4 |
| 4,721,654 | 1/1988 | Richardson et al. | 428/474.4 |
| 4,800,129 | 1/1989 | Deak | 428/476.3 |
| 4,801,486 | 1/1989 | Quacquarella et al. | 428/476.3 |

FOREIGN PATENT DOCUMENTS

| | | | |
|---|---|---|---|
| 62822 | 10/1982 | European Pat. Off. | 428/476.3 |
| 16582 | 2/1979 | Japan | 428/476.3 |

Primary Examiner—Edith Buffalow
Attorney, Agent, or Firm—John J. Toney; William D. Lee, Jr.; Mark B. Quatt

[57] ABSTRACT

A barrier stretch film comprises an outer layer of a heat sealable polymeric material; a first interior layer of an oxygen barrier polymeric material; a second interior layer of a high molecular weight polymer; an inner copolyamide layer; and an adhesive between the second interior and inner layers.

6 Claims, 1 Drawing Sheet

4,939,076

BARRIER STRETCH FILM

This application is a continuation-in-part of U.S. Ser. N. 168,290, filed Mar. 15, 1988, now abandoned.

FIELD OF THE INVENTION

The present invention relates to thermoplastic packaging film, and particularly to thermoplastic films with elongation and oxygen barrier characteristics.

BACKGROUND OF THE INVENTION

Thermoplastic films, and in particular stretchable thermoplastic films have proven to be useful in the packaging of food as well as non-food items.

An example of a stretchable film particularly useful in the packaging of food products such as poultry is the film described in U.S. Pat. No. 4,617,241 issued to Mueller and describing a stretch/shrink film. Other films, such as those described in U.S. Pat. No. 4,399,180 issued to Briggs et al have proven especially useful in pallet wrapping or the wrapping of products prepackaged in a container.

While such films have been successful in certain applications, enhanced oxygen barrier properties are needed in the packaging of certain perishable food items such as cheese. This is required to maintain the quality of the product and maintain an aesthetically pleasing appearance for the customer a point of sale.

A polymeric material which has proven particularly effective in thermoplastic film technology has been vinylidene chloride copolymer commonly known as saran, a trademark of Dow Chemical Company. The comonomers typically used in connection with a vinylidene chloride copolymer are vinyl chloride or methyl acrylate. While the oxygen transmission rates of saran are exceptionally low, therefore making this material attractive as a barrier polymer, saran of the type having no plasticizer or a low plasticizer content has a tendency to be brittle and non-stretchable when used in multilayer thermoplastic films. Because of this feature, multilayer films made with saran can be unacceptable in applications where a substantial amount of stretchability or elongation in the film is required to produce an acceptable package.

It is therefore desirable to combine the good oxygen barrier properties of copolymers such as saran or ethylene vinyl alcohol copolymer, with sufficient elongation properties to produce a film which has both stretch characteristics and oxygen barrier characteristics.

Of interest is U.S. Pat. No. 4,226,882 issued to Yoshikawa et al disclosing a five layer film having a core layer of polyvinylidene chloride, intermediate layers of ethylene copolymer, and outer layers of ionomer or, in one outer layer, an olefin.

Also of interest is U.S. Pat. No. 4,352,844 issued to Bornstein and disclosing a multilayer film in which a layer of vinylidene chloride copolymer is extruded with one or more layers of ethylene vinyl acetate copolymer (EVA).

U.S. Pat. No. 4,376,799 issued to Tusim discloses a multilayer material having a polyvinylidene chloride core, combined with the use of ethylene vinyl acetate copolymer as a blending material in skin layers and intermediate layers of a five layer structure.

U.S. Pat. No. 4,390,587 issued to Yoshimura et al discloses multilayer film having a core layer of polyvinylidene chloride, intermediate layers of ethylene vinyl acetate copolymer, and outer layers of the same composition as the intermediate layers or, for one outer layer, an ionomer.

U.S. Pat. No. 4,457,960 issued to Newsome discloses the use of saran in combination with ethylene vinyl acetate copolymer.

An additional useful property in such applications is flexibility or lower modulus.

It is therefore an object of the present invention to provide a thermoplastic film with a combination of oxygen barrier and elongation properties.

It is a further object of the invention to provide a film for use in packaging applications which has a relatively low modulus i.e. relatively good flexibility.

SUMMARY OF THE INVENTION

In one aspect of the invention, a barrier stretch film comprises an outer layer comprising a heat sealable polymeric material; a first interior layer comprising an oxygen barrier polymeric material; a second interior layer comprising a high molecular weight polymeric material; an inner layer comprising a copolyamide; and a polymeric adhesive disposed between the second interior and inner layers.

In another aspect of the present invention, a method of making a barrier stretch film comprises producing a first melt stream of a heat sealable polymeric resin, a second melt stream of an oxygen barrier polymeric material, a third melt stream of a high molecular weight polymeric material, a fourth melt stream of a copolyamide, and a fifth melt stream of a polymeric adhesive; coextruding the melt streams through an annular die to form a tubular film; hot blowing the coextruded tubular film; cooling the hot blown film; and collapsing the cooled film to form a lay-flat tubular film.

DEFINITIONS

The term "heat sealable" as used herein refers to a polymeric resin or combination of resins which can be sealed to itself or to another material by the application of heat and pressure.

The term "barrier" as used herein means a layer of a multilayer film which comprises a material which acts as a physical barrier to gaseous oxygen molecules. Typically the presence of a barrier layer within a film will reduce the oxygen permeability of the film to less than 70 c.c. per square meter, in 24 hours, at one atmosphere, 73° F. and 0% relative humidity. The value should be obtained in accordance with ASTM D3985-81.

The term "outer" as used herein means a layer which will normally comprise the surface of a multilayer film, but to which may be added additional layers by lamination, coextrusion, or other means known in the art.

The term "interior" as used herein refers to a layer of a multilayer film which is not a skin or surface layer of the film.

The term "high molecular weight" as used herein refers to a melt index of less than about 3 grams, and preferably less than about 1.5 grams, per 10 minutes at standard ASTM conditions.

The term "copolyamide" is used herein to refer to a copolymer of two polyamides, such as copolymers of nylon 6 and nylon 12.

The term "polymeric adhesive" refers herein to chemically modified polyolefins suitable for bonding adjacent resin layers in a multilayer thermoplastic film. These materials include those available from du Pont under the "CXA" or "Bynel" trademarks, as well as the series of polymeric adhesives available from Quantum under the "Plexar" trademark.

The term "ethylene vinyl acetate copolymer" (EVA) as used herein refers to a copolymer formed from ethylene and vinyl acetate monomers wherein the ethylene derived units in the copolymer are present in major amounts and the vinyl acetate derived units in the copolymer are present in minor amounts.

The term "linear low density polyethylene" (LLDPE) as used herein refers to copolymers of ethylene with one or more comonomers selected from $C_4$ to $C_{10}$ alpha olefins such as butene-1, octene, 1-methyl pentene, and hexene-1 in which the molecules thereof comprise long chains with a few side chains, branches or cross linked structures. The side branching which is present will be short as compared to the non-linear polyethylenes. The molecular chains of a linear polymer may be intertwined. Linear low density polyethylene has a density usually in the range of from about 0.915 grams/cc to about 0.940 grams/cc and, preferably, the density should be maintained between about 0.915 grams/cc to 0.928 grams/cc for film making purposes. The melt flow index of linear low density polyethylene generally ranges from between about 0.1 to about 10 grams per 10 minutes and preferably between from about 0.5 to about 3.0 grams per 10 minutes. Resins of this type are commercially available and are manufactured in low pressure vapor phase and liquid phase processes using transition metal catalysts.

The term "very low density polyethylene" (VLDPE) is used herein to refer to copolymers of ethylene with other alpha-olefins such as those described above for LLDPE. Densities generally range between about 0.890 and 0.915 grams/cc.

DESCRIPTION OF THE PREFERRED EMBODIMENTS

Figure 1:
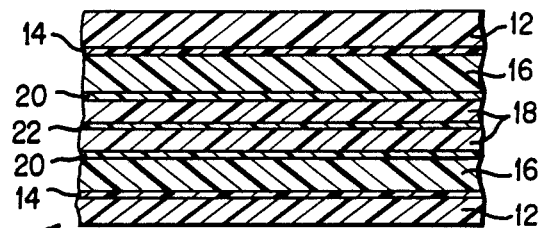
FIG. 1 is a cross-sectional view of a double wound film in accordance with the present invention.

Referring to FIG. 1, a multilayer barrier stretch film 10 includes an outer heat sealable layer 12. A preferred material for heat sealable layer 12 is a copolymer of ethylene and an unsaturated ester comonomer. More preferred is an ethylene vinyl acetate copolymer or ethylene butyl acrylate copolymer (EBA). The most preferred resin for outer layer 12 is ethylene vinyl acetate copolymer with a vinyl acetate content of about 12%. An example of a suitable resin for layer 12 is Elvax 3130 available from du Pont.

First interior layer 14 comprises a polymeric material with relatively low oxygen transmission features. In some applications, a moderate barrier may be obtained by the use of materials such as nylon 6. However, where exceptional oxygen barrier characteristics are necessary in the final film, preferred resins include ethylene vinyl alcohol copolymer (EVOH) and polyvinylidene chloride copolymer (PVDC) commonly known as saran.

EVOH is well known for its excellent oxygen barrier characteristics at relatively low humidities. It is also known that the barrier characteristics of EVOH at higher relative humidities progressively degrades. In some applications where a high moisture environment may be present, this material may be less preferred than saran which is not only relatively insensitive to high relative humidity environments, but in the case of unplasticized saran actually performs somewhat better at these conditions.

The comonomer in the PVDC is preferably either vinyl chloride or methyl acrylate. Either plasticized or unplasticized sarans may be utilized in accordance with the present invention. Unplasticized sarans, with little or no plasticizers to impair the oxygen barrier performance of the material, have exceptionally good barrier i.e. low oxygen transmission rates. One negative feature of such materials is the more brittle, i.e. less flexible nature of unplasticized sarans compared with plasticized sarans. As will be seen below, an unplasticized saran may be successfully used in producing the present inventive film by the use of particular materials as the inner layer of the film structure which offset the more brittle nature of the higher barrier but more brittle unplasticized sarans. Preferred resins for layer 14 include either PV858 or PV864 unplasticized sarans manufactured by Solvay. These are similar resins, with PV864 having a larger particle size than PV858. For the sake of economy, barrier layer 14 is preferably relatively thin consistent with the barrier requirements of the end use for which the multilayer film is made.

Second interior layer 16 is a polymeric material of high molecular weight i.e. a melt index of less than about 3 grams/10 minutes. Layer 16 provides much of the elongation characteristics of the final multilayer film. Several materials are suitable for layer 16, including ethylene vinyl acetate copolymer, ethylene butyl acrylate copolymer, linear low density polyethylene (LLDPE) and very low density polyethylene (VLDPE). The high molecular weight of layer 16 will facilitate the processing of the material during production using a hot blown method, as well as providing desired elongation characteristics in the final film. An especially preferred material for layer 16 is Elvax 3508 commercially available from Du Pont. This resin is an ethylene vinyl acetate copolymer with 12% vinyl acetate by weight, and a melt index of about .3. For processing considerations, a melt index of about 3.0 is a practical upper limit for most resins of choice, with increasing difficulty in processing above this limit. Materials with melt indices of less than about 1 gram/10 minutes, i.e. fractional melt index, are most preferred.

Inner layer 18 is adhered to layer 16 by means of an adhesive layer 20. Layer 18 comprises a copolyamide, especially a copolymer of nylon 6 and nylon 12. One commercially available copolyamide of this type is CA-6E, a copolyamide having 60% nylon 6 and 40% nylon 12 with residual monomer. This material is marketed under the trademark Grillon. A similar material also produced by Emser Industries is Grillon CA-6. Another possible copolyamide for use in layer 18 is Grillon CR-9, a copolyamide having 20 to 30% nylon 6 and 70 to 80% nylon 12. The copolyamide of layer 18 forms an important part of the final film structure in that it provides the flexibility needed in many packaging applications. The flexibility, i.e. low modulus of the copolyamide will help offset the use of desirable but brittle unplasticized sarans discussed earlier in the specification. When using tubular extrusion technology, the inner layer 18 of copolyamide will adhere to itself when the tube is collapsed. The present invention is believed to be limited to a double wound configuration when tacky copolyamide materials are used for inner layer 18. However, it is clear that other materials may be available which will perform substantially as well as a copolyamide in terms of providing flexibility to the film. In those cases where blocking or tackiness of the film is less severe than in the case of the copolyamides, single wound versions of the film ma be practical.

Adhesive layer 20 adheres inner layer 18 to the second interior layer 16. Suitable resins include CXA E 162, a chemically modified EVA-based polyolefin adhesive form Du Pont. Other suitable adhesive materials such as certain Plexar adhesive resins are available from Quantum. Generally, any adhesive capable of bonding an ethylene copolymer to polyamide can be used for adhesive layer 20.

Figure 2:
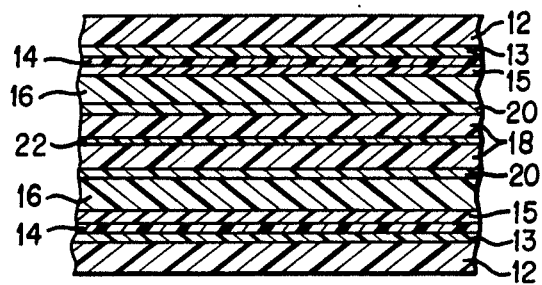
FIG. 2 is a cross-sectional view of a preferred embodiment of double wound film of the invention.

Depending on the composition of the heat sealable layer 12 and the particular barrier material selected for first interior layer 14, additional polymeric adhesive layers may be necessary or desirable to provide or enhance the interlaminar bonding between layers 12 and 14 respectively, or between layers 14 and 16 respectively. In this event, layer 13 and 15 may be provided as depicted in FIG. 2. In the preferred embodiment of the present invention, such layers are present and comprise an ethylene vinyl acetate copolymer. A suitable commercial resin for layers 13 and 15 is Elvax 3165 available from du Pont having a vinyl acetate content of 18% by weight, and a melt index of about .7.

The practical lower limit of the thickness of the final double wound multilayer film is about 1 mil. At this gauge, the blown tubular material would have a thickness of about .5 mils or 50 gauge. While this is the practical lower limit of the preferred embodiment of the multilayer film, thicker films may be produced. However, the thinness of the film is an asset in many film applications.

The barrier stretch film of the present invention is characterized by three important physical properties: good elongation characteristics, high oxygen barrier, and good flexibility, i.e. low modulus. These features are evident in Table 1, where elongation, oxygen barrier, and modulus data are listed for two samples of the present invention, Sample 1 and Sample 2, compared with a control film listed as Sample 3.

Sample 1 was a 150 gauge (1.5 mil) material having the following structure:

$EVA_1/EVA_2/Saran/EVA_2/EVA_3/Adhesive/Copolyamide$

The resin used for each of the layers is identified below:

$EVA_1 = Elvax\ 3130$ $EVA_2 = Elvax\ 3165$ $EVA_3 = Elvax\ 3508$ $Saran = PV864$ $Adhesive = CXA\ E162$ $Copolyamide = CA6E$ Sample 2 was identical in all respects to Sample 1 but with a nominal thickness of about 100 gauge (1 mil) for the double wound version. These films were stretch films with minimal amounts of shrink, and were not stretch oriented. In in-house testing, Sample 1 was found to have inferior sealability due to the requirements of heat to obtain the seal before burnouts occurred. Sample 2 performed exceptionally well with excellent sealability at relatively low temperatures. The materials were tested on an Omori 2132 machine with a 3069 D Sealer Cooler. Sample 2 also showed high slip properties, excellent stretch with high elongation, good tear and puncture strength, and outstanding tear propagation. Optical properties were inferior to commercially available stretch shrink films.

Sample 3, the control, had the following structure:

$EVA/LDPE/LLDPE/EVA/Saran/EVA/EVA$

The results utilized in the control film are identified as follows:

$EVA = Exxon\ 32.89\ (4\%\ VA)$ $LDPE = Alathon\ F\ 3445\ (4\%\ VA)$ $LLDPE = Escorene\ LL\ 3001.63$ $Saran = PV964$

TABLE 1

| | Sample 1 | Sample 2 | Sample 3 |
|---|---|---|---|
| Tensile at Break and 73° F. (PSI)[1] | | | |
| Av. Long. | 60.9 × 100 | 54.3 × 100 | 26.1 × 100 |
| Std. Dev. | 3.0 × 100 | 3.9 × 100 | 1.1 × 100 |
| 95% C.L.[2] | 4.8 × 100 | 6.3 × 100 | 1.7 × 100 |
| Av. Trans. | 49.3 × 100 | 38.1 × 100 | 17.4 × 100 |
| Std. Dev. | 0.7 × 100 | 6.3 × 100 | 1.1 × 100 |
| 95% C.L. | 1.2 × 100 | 10.1 × 100 | 1.7 × 100 |
| Elongation at Break and 73° F. (PSI)[3] | | | |
| Av. Long. | 516 | 343 | 191 |
| Std. Dev. | 49 | 30 | 29 |
| 95% C.L. | 77 | 48 | 46 |
| Av. Trans. | 685 | 589 | 392 |
| Std. Dev. | 4 | 73 | 155 |
| 95% C.L. | 6 | 116 | 247 |
| Modulus at 73° F. (PSI)[4] | | | |
| Av. Long | 27.9 × 1000 | 26.0 × 1000 | 50.4 × 1000 |
| Std. Dev. | 0.5 × 1000 | 1.0 × 1000 | 2.0 × 1000 |
| 95% C.L. | 0.8 × 1000 | 1.6 × 1000 | 3.2 × 1000 |
| Av. Trans. | 31.8 × 1000 | 31.2 × 1000 | 49.2 × 1000 |
| Std. Dev. | 0.6 × 1000 | 0.6 × 1000 | 0.8 × 1000 |
| 95% C.L. | 1.0 × 1000 | 0.9 × 1000 | 1.3 × 1000 |
| Ball Burst Impact at 73° F. 1.00 In. Diam. Sphere Hd. (cm. × kg.)[5] | | | |
| Average | 15.0 | 7.4 | 1.0 |
| Std. Dev. | 2.2 | 0.8 | 0.2 |
| 95% C.L. | 3.4 | 1.2 | 0.3 |
| Oxygen Transmission at 73° F., 0% RH[6] | | | |
| Sample A | 23.30 | 47.50 | |
| Sample B | 23.30 | 29.50 | |
| Sample C | 26.00 | 32.30 | |

Notes:
[1]ASTM D882-81.
[2]C.L. is confidence limit - For example, if the reported average value was 10 and the 95% C.L. was 2, then of 100 replicate readings, 95 would have a value between 8 and 12 inclusive.
[3]ASTM D-882-81.
[4]ASTM D-882-81.
[5]ASTM D-3420-80.
[6]Units of cubic centimeters STP/(24 hours, square meter, atmosphere); approximate at 2 mils film thickness; ASTM D3985.

The barrier stretch film of the present invention may be used as the core component of other films and laminates, as described further in the following additional examples:

EXAMPLE 4

A barrier stretch film was coextruded, having a structure identical to that of Sample 1, except that instead of Elvax 3130 in the outermost layer, the film had Elvax 3124, another EVA, (hereafter "EVA$_4$") as the outer layer. The self-welding layer was CA6.

Oriented polyester was corona laminated to one side of the collapsed tube. The other side of the collapsed tube was corona bonded to the following structure:

EVA$_4$/LLDPE$_2$/LDPE/LLDPE/LDPE/TIE/EPC
where

LLDPE$_2$ = Dowlex 2045

TIE = Plexar 169

EPC = KS409 (ethylene propylene copolymer)

EXAMPLE 5

A film like that of Example 4 was produced by the same methods described above, but having an additional layer of EVOH (ECG 156) disposed between the self-welding layer and the polymeric adhesive (CXA E162) layer.

EXAMPLE 6

A barrier stretch film was coextruded, having a structure like that of Sample 1, except that instead of Elvax 3130 in the outermost layer, the film had a blend of 90% LLDPE (Dowlex 2035) and 10% of an antiblocking agent.

EXAMPLE 7

A barrier stretch film was coextruded, having a structure like that of Sample 1.

To this film was corona bonded another stretch film, SSD-310 manufactured by W. R. Grace & Co.-Conn. SSD-310 has the structure EVA/LLDPE/EVA/LLDPE/EVA.

EXAMPLE 8

A lid stock material was made having the same structure as in Sample 1, except that in place of the Elvax 3130, a polyester (PETG 6763) was used, and in place of the Elvax 3165 adjacent the outermost layer, a polymeric adhesive Plexar 3342, was used.

Additional testing compared the barrier stretch film component of Example 4, i.e. EVA$_4$/EVA$_2$/Saran/EVA$_2$/Adhesive/CA6 with a similar film having an ethylene vinyl acetate copolymer as the self-welding layer in place of CA6.

In Table 2 below, the first of these, labelled "X" is compared with the latter structure, labelled "Y", for the various physical properties tested in Table 1.

TABLE 2

| | X | Y |
|---|---|---|
| Tensile at Break and 73° F. (PSI)[1] | | |
| Av. Long. | 31.3 × 100 | 48.7 × 100 |
| Std. Dev. | 1.4 × 100 | 5.7 × 100 |
| 95% C.L.[2] | 2.2 × 100 | 9.1 × 100 |
| Av. Trans. | 31.0 × 100 | 54.1 × 100 |
| Std. Dev. | 1.0 × 100 | 2.1 × 100 |
| 95% C.L. | 1.6 × 100 | 3.3 × 100 |
| Elongation at Break and 73° F. (PSI)[3] | | |
| Av. Long. | 668 | 660 |
| Std. Dev. | 29 | 30 |
| 95% C.L. | 46 | 47 |
| Av. Trans. | 705 | 730 |
| Std. Dev. | 25 | 22 |
| 95% C.L. | 40 | 36 |
| Modulus at 73° F. (PSI)[4] | | |
| Av. Long. | 12.3 × 1000 | 18.7 × 1000 |
| Std. Dev. | 0.2 × 1000 | 2.2 × 1000 |
| 95% C.L. | 0.3 × 1000 | 3.4 × 1000 |
| Av. Trans. | 14.8 × 1000 | 18.3 × 1000 |
| Std. Dev. | 0.9 × 1000 | 0.3 × 1000 |
| 95% C.L. | 1.4 × 1000 | 0.5 × 1000 |
| Ball Burst Impact at 73° F. 1.00 In. Diam. Sphere Hd. (cm. × kg.)[5] | | |
| Average | 35.9 | 19.5 |
| Std. Dev. | 11.6 | 0.8 |
| 95% C.L. | 18.4 | 1.3 |
| Oxygen Transmission at 73° F., 0% RH[6] | | |
| Sample A | 17.50 | 13.90 |
| Sample B | 13.10 | 12.50 |
| Sample C | 11.80 | 10.50 |

Although the present invention has been described in conjunction with preferred embodiments, it should be understood that modifications may be made without departing from the scope of the invention as those skilled in the art will readily understand. Accordingly, such modifications may be practiced within the scope of the following claims.

What is claimed is:

1. A barrier stretch film comprising:
   (a) an outer layer comprising a heat sealable polymeric material selected from the group consisting of ethylene vinyl acetate copolymer, ethylene butyl acrylate copolymer, linear low density polyethylene, and polyester;
   (b) a first interior layer comprising an oxygen barrier polymeric material;
   (c) a second interior layer comprising a high molecular weight polymeric material;
   (d) an inner layer comprising a copolyamide, and
   (e) a polymeric adhesive disposed between the second interior and inner layers; wherein said film is a lay-flat tubular film having its interior lay-flat surfaces self-welded.

2. A film according to claim 1 wherein the first interior layer comprises an oxygen barrier polymeric material selected from the group consisting of vinylidene chloride copolymer, and ethylene vinyl alcohol copoylmer.

3. A film according to claim 2 wherein the oxygen barrier polymeric material comprises unplasticized vinylidene chloride copolymer.

4. A film according to claim 1 wherein the second interior layer comprises a polymeric material of high molecular weight selected from the group consisting of ethylene vinyl acetate copolymer, ethylene butyl acrylate copolymer, linear low density polyethylene, and very low density polyethylene.

5. A film according to claim 1 wherein the polymeric adhesive comprises a chemically modified polyolefin.

6. A barrier stretch film according to claim 1 further comprising a second film, bonded to one surface of said barrier stretch film, comprising a polymeric material selected from the group consisting of:
(a) oriented polyester,
(b) oriented nylon,
(c) a multilayer film having an outer layer of propylene homopolymer or copolymer and an inner bonding layer of ethylene vinyl acetate copolymer, and
(d) a biaxially oriented stretch film having exterior and core layers of ethylene vinyl acetate copolymer, and two intermediate layers of linear low density polyethylene.

* * * * *